United States Patent Office.

FRITZ STORCK, OF PRAGUE, AUSTRIA-HUNGARY, ASSIGNOR TO THE FARBWERKE, VORMALS MEISTER, LUCIUS & BRÜNING, OF HOCHST-ON-THE-MAIN, GERMANY.

PROCESS OF PRODUCING AZO COLORS ON FIBER.

SPECIFICATION forming part of Letters Patent No. 569,392, dated October 13, 1896.

Application filed October 31, 1895. Serial No. 567,527. (No specimens.) Patented in Germany November 4, 1893, No. 80,409; in France November 6, 1893, No. 233,876, and in England November 6, 1893, No. 21,087.

*To all whom it may concern:*

Be it known that I, FRITZ STORCK, a citizen of France, residing at Prague, in the Empire of Austria-Hungary, have invented certain new and useful Improvements in the Process of Producing Insoluble Azo Colors on Fibers, (for which Letters Patent were granted to me in Germany, No. 80,409, dated November 4, 1893; in France, No. 233,876, dated November 6, 1893, and in Great Britain, No. 21,087, dated November 6, 1893,) of which the following is a specification.

It is well known that both in printing and dyeing insoluble azo colors have during several years been developed on cotton fiber on a large scale, and that almost exclusively in the form of beta-naphthol compounds. During this time many experiments have been made to produce on the beta-naphthol prepared fiber, besides red and claret, a pretty and fast blue in the form of an azo color, but none of these efforts have succeeded. All that could be attained was to develop a blue of little beauty or fastness, by employing for the ground another component beta-oxynaphthoic acid (melting-point 216° centigrade) and as second component dianisidin; but the color thus obtained has to be treated with sulfate of copper in order to give it some degree of fastness in washing, and, moreover, this method of grounding has the disadvantage that, except blue, no other color, such as red or claret, can be produced upon it. It is therefore impossible to produce in this manner a many-colored fabric. Another objection to the practical introduction of this process is the high price of the oxynaphthoic acid.

I have now discovered that a beautiful blue can be obtained by adding cupric chlorid to the diazo solution of the dianisidin, whereas by employing the copper salt only a red-violet is obtained. A similar effect, marked principally by greater fastness, is obtained when cupric chlorid is added to the diazo compounds of other bases which have been used for producing azo colors on the fiber.

The process for the production of the color is the usual one. The goods are padded with beta-naphthol sodium, or another phenol suitable for coupling, with or without addition of Turkey-red oil. The goods are dried and then printed with the thickened diazo solution with addition of cupric chlorid, or are passed through the chlorid in unthickened state.

*Example.*

A. The goods are padded with a solution of one hundred and fifty grams beta-naphthol in two hundred and fifty grams soda-lye of 22° Baumé, with addition of about four hundred or five hundred grams Turkey-red oil, the mixture brought up to ten liters. The goods are dried and printed with the diazo solution described hereinafter, or passed through it.

B. Diazo solution: Sixty-one grams of dianisidin base, one hundred and six grams of hydrochloric acid, 22° Baumé, six hundred grams of water, five hundred grams of ice, two hundred and sixty-five grams of sodium nitrate.

C. Printing-color: Fifteen grams of diazo solution, six grams of cupric chlorid, 40° Baumé, fifty grams of gum-water, thirty-five grams of water.

What I claim as my invention is—

The process herein described of producing fast insoluble azo colors on the fiber, which consists in impregnating the fibers to be dyed or printed with a sodium salt of phenol, and subsequently submitting the fibers to the action of mixtures of diazo compounds of aromatic bases with cupric chlorid, substantially as set forth.

In testimony that I claim the foregoing as my invention I have signed my name in presence of two subscribing witnesses.

FRITZ STORCK.

Witnesses:
WILHELM EISHENWALD,
ALOLPH FISCHER.